United States Patent

[11] 3,543,815

[72] Inventor Donald C. Menge
 Warren, Michigan
[21] Appl. No. 670,146
[22] Filed Sept. 25, 1967
[45] Patented Dec. 1, 1970
[73] Assignee Troy Steel Corporation
 Warren, Michigan
 a corporation of Michigan

[54] TRUSS CUTTING APPARATUS WITH TWO CUTTING STATIONS
 20 Claims, 11 Drawing Figs.
[52] U.S. Cl. ..................................................143/6, 143/46
[51] Int. Cl. ..................................................... B27g 5/02
[50] Field of Search............................................. 143/6,
 6—46, 6—47, 6—2, 46, 47—6, 159

[56] References Cited
UNITED STATES PATENTS
| 823,506 | 6/1906 | Cadorette et al. | 143/6 |
|---|---|---|---|
| 834,206 | 10/1906 | Kantner | 143/6 |
| 1,481,569 | 1/1924 | Tannewitz | 143/6(46)UX |
| 1,808,453 | 6/1931 | Koning | 143/6(46)UX |
| 3,026,917 | 3/1962 | Schwartz | 143/6(46)UX |

Primary Examiner—Donald R. Schran
Attorney—Hauke, Gifford & Patalidis

ABSTRACT: A pair of spaced saw-supporting pedestals are mounted on a frame for horizontal movement toward and away from one another. A section of unfinished lumber spans the two pedestals. Each pedestal is rotatable about a vertical axis to individually position a power saw to cut the lumber at a selected pitch and a predetermined length. The apparatus includes a novel telescoping saw shield and a novel lumber clamp.

Patented Dec. 1, 1970

3,543,815

INVENTOR.
DONALD C. MENGE
BY
ATTORNEYS.

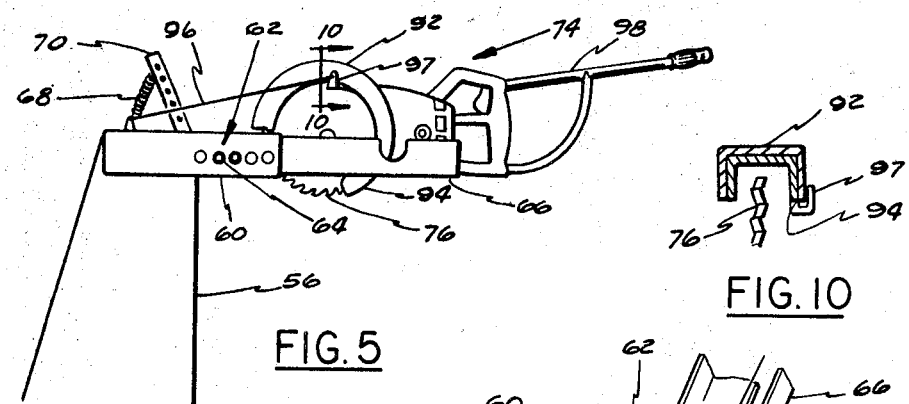
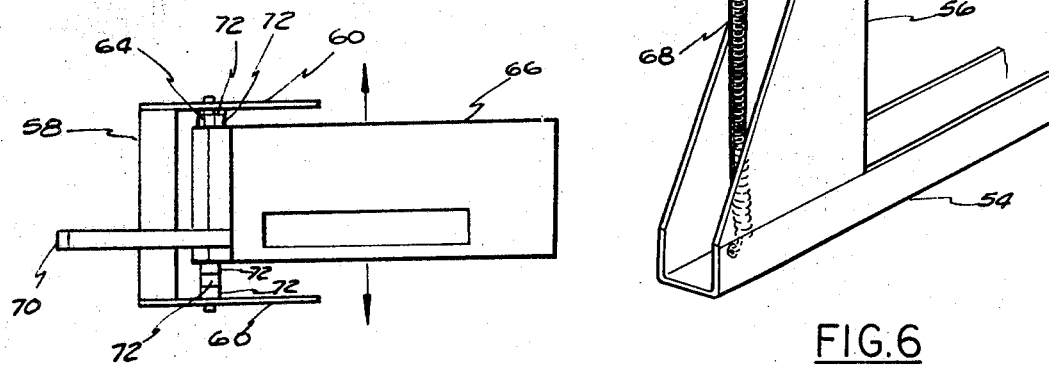
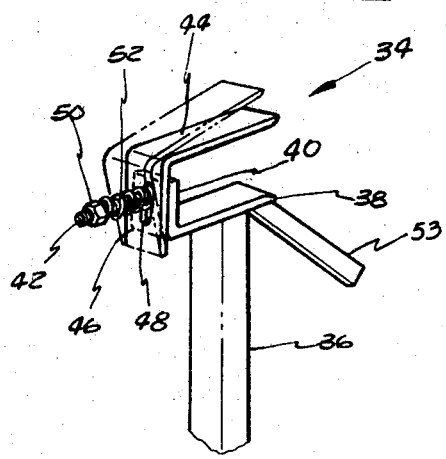

TRUSS CUTTING APPARATUS WITH TWO CUTTING STATIONS

BACKGROUND OF THE INVENTION

1. Field Of The Invention

This invention relates to cutting apparatus for forming a section of unfinished lumber into an element for a prefabricated truss and more specifically to a cutting apparatus employing a pair of saw-supporting stations, each station mounted on a frame for movement toward and away from one another between positions corresponding to the length of the finished truss element, and each station rotatable about a vertical axis substantially intersecting the axis of the lumber so that their respective saws are positioned to cut the lumber at a selected pitch.

2. Description Of The Prior Art

Prefabricated, wooden building trusses require a series of interconnected precut wooden webs and diagonals. The elements of each truss are normally precut, clamped together and nailed to form the finished truss.

A major problem confronting the fabricator of prefabricated trusses is that each truss requires a number of webs and diagonals of different lengths having its ends precut at different pitches. It is present practice to employ very sophisticated and expensive sawing apparatus in order to form a section of unfinished lumber into a truss element.

It is the broad purpose of the present invention to provide an improved cutting apparatus for forming truss elements which is formed from a relatively few inexpensive components into a versatile cutting apparatus and has a number of features permitting a single operator to form truss elements at a greater output than can be achieved by comparable conventional equipment,

SUMMARY

The preferred embodiment of the present invention, which will be subsequently described in greater detail, comprises an elongated frame having a track for supporting a pair of generally semicircular carriages. The carriages are movable toward and away from one another to positions accommodating the particular length of the finished truss element.

Each carriage supports a clamping device and a saw-supporting pedestal. Each clamping device comprises a pair of cooperating jaw elements formed into a substantially C-shaped configuration with the upper jaw element spring loaded so that a section of raw lumber can be inserted through the open end of the clamp and seated on the lower jaw element. A section of unfinished lumber spans the two carriages and is supported in the two clamping units. Other types of clamps may also be used.

Each saw-supporting pedestal is mounted on its carriage for rotation about a vertical axis which intersects the unfinished lumber. A rotary power saw is supported on a pivotal arm mounted on each of the pedestals in such a manner that the saw can be lowered from a normally raised position downwardly into cutting engagement with the unfinished lumber.

The saw engages the lumber at a pitch determined by the angular position of the pedestal relative to the longitudinal axis of the lumber. A protractor is laid out on the carriage with indicia corresponding to various angles of rotation of the pedestal. A pair of stop members are clamped to the periphery of the carriage at positions corresponding to the desired pitch of a double end cut truss element. An arm extending radially from the pedestal traverses the protractor and engages the stops as the pedestal is swung by the operator from a central, neutral position.

Preferably each carriage has a protractor with an individual series of angular indicia. Thus during the setup operation, the operator clamps the four stops at four discrete angles. This arrangement eliminates any possibility of the operator clamping the stops at the wrong angle.

A linear scale inscribed on the frame between the carriages provides means for spacing the carriages on the frame in a position accommodating the desired length of the finished truss element.

A power saw mounted on each of the pedestals is preferably of the rotary type with a channel shaped guard partially sheathing the circumferential cutting edge of the blade. A second channel shaped guard is swingable about the axis of rotation of the blade between retracted and extended positions with respect to the fixed guard. When the saw is in its raised noncutting position, the second guard is extended and substantially encloses the cutting edge of the blade. A cable having one end fixed to the pedestal and its opposite end connected to the movable guard retracts the movable guard within the fixed guard as the saw is lowered to a cutting position. As the movable guard is retracted, a circumferential segment of the saw is exposed to engage the lumber. When the saw-supporting arm is raised from its cutting position, the movable guard extends from its retracted position and encloses substantially all of the exposed cutting teeth thereby providing an important safety feature.

The saw supporting arm is mounted on a pivot pin which can be positioned at a selected distance from the cutting area. This adjustment permits a relatively small diameter blade to accommodate different widths of lumber.

The pivot pin also permits the position of the saw-supporting arm to be laterally adjusted in order to adjust the cutting plane of the blade.

A chute is disposed below each cutting area and provides an easy means for collecting the cutoff sections of lumber by permitting the lumber to fall of its own weight assisted by the draft created by the rotating saw blade. This eliminates blowers and conveyors which are normally utilized with conventional truss cutting apparatus.

It is therefore an object of the present invention to provide an improved cutting apparatus for preforming the opposite ends of a wooden truss element.

It is another object of the present invention to provide a cutting apparatus for sawing an unfinished section of lumber into a truss element having its opposite ends cut at a predetermined pitch by providing a frame having a pair of saw stations mounted thereon for relative movement toward and away from one another to positions accommodating the length of the finished truss element, each of the saw stations being rotatable about a vertical axis to selected positions corresponding to the desired pitch.

It is still another object of the present invention to provide an improved truss-cutting apparatus for sawing an unfinished section of lumber into a precut truss element comprising an elevated clamping device and an elevated saw-supporting pedestal having a power saw mounted thereon for movement toward cutting engagement with a section of unfinished lumber supported in the clamping device and including chute means disposed below the cutting area for collecting the sawed off sections of lumber.

Another object of the present invention is to provide a truss-cutting apparatus having a cutting station including a saw-supporting pedestal mounted for movement about an axis to angular positions corresponding to the desired pitch at which the unfinished lumber is to be cut and including stop means which are disposed in selected positions on a protractor for defining the cutting positions of the pedestal.

Still another object of the present invention is to provide an improved retractable guard means for a rotary saw blade supported for movement between a cutting position and a noncutting position, the guard means including a fixed channel-shaped guard and a movable channel-shaped guard, the movable channel-shaped guard retracting into the fixed channel-shaped guard when the saw is moved toward a cutting position and extending from the fixed guard to enclose the cutting teeth when the saw is moved toward a noncutting position.

Another object of the present invention is to provide an improved clamping device for supporting a section of uncut lumber in a truss-cutting device.

Still further objects and advantages of the present invention will readily occur to one skilled in the art to which the invention pertains upon reference to the following description,

DESCRIPTION OF THE DRAWINGS

The description refers to the accompanying drawings in which like reference characters refer to like parts throughout the several views and in which:

FIG. 5 is an elevational view of the preferred saw-supporting pedestal similar to FIG. 4, but with the saw-supporting arm in its lowered cutting position;

FIG. 6 is another view of the preferred saw-supporting pedestal with the saw removed for purposes of the description;

FIG. 7 is a plan view of the preferred saw-supporting pedestal with the power saw removed;

FIG. 8 is an enlarged perspective view of the preferred lumber-clamping device;

FIG. 9 is a view illustrating alternative cuts that can be made by laterally positioning the saw and its supporting pedestal;

FIG. 10 is an enlarged view taken along the line 10–10 of FIG. 5; and angle.

DESCRIPTION OF THE PREFERRED EMBODIMENT

Figure 1:
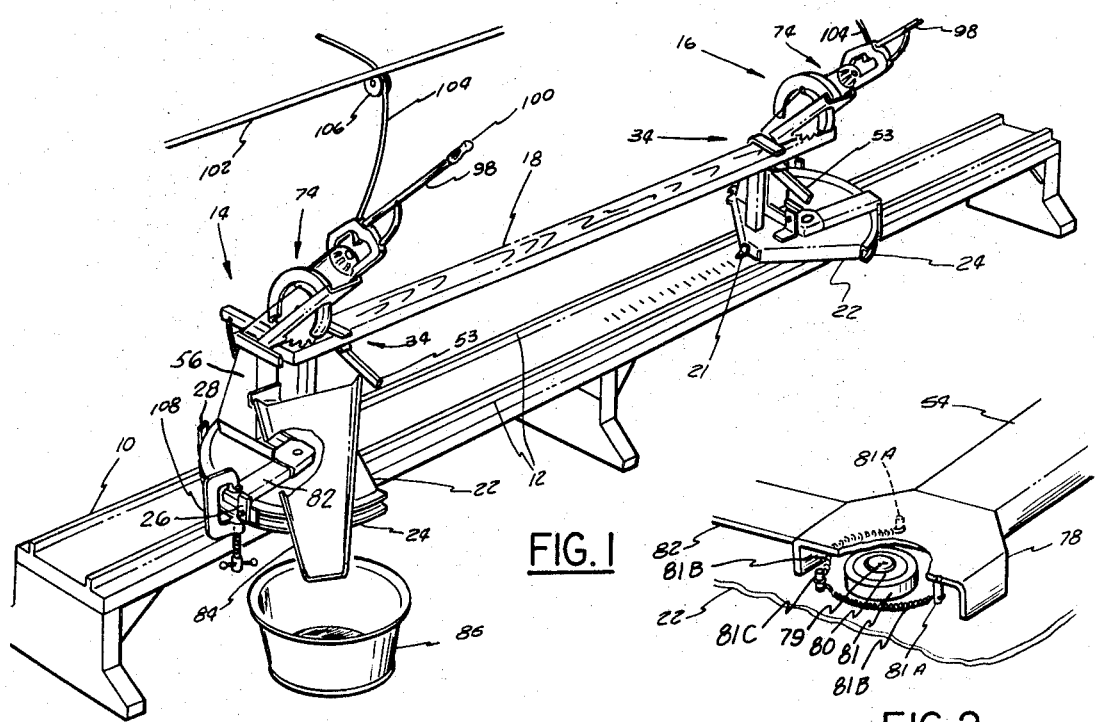
FIG. 1 is a perspective view of a cutting apparatus illustrating the preferred embodiment of the present invention with parts of the chutes broken away for purposes of description.

Referring to the drawings, the preferred cutting apparatus is illustrated in FIG. 1 as comprising an elongated frame 10 having a pair of spaced parallel horizontal track members 12. A pair of cutting stations 14 and 16 are mounted on the frame 10 and are movable along the track toward and away from one another. Preferably the cutting station 14 is releasably clamped on the frame 10 and the opposite cutting station 16 is movable relative to the cutting station 14 to a position accommodating the length of a finished truss element 18 which spans the two stations 14 and 16.

The cutting stations 14 and 16 are similar to one another except for a right- and left-hand relationship and with a few other exceptions which will be noted. Preferably the cutting stations 14 and 16 face in a common direction to enable the operator to position the lumber and do the required cutting from one side.

Figure 3:
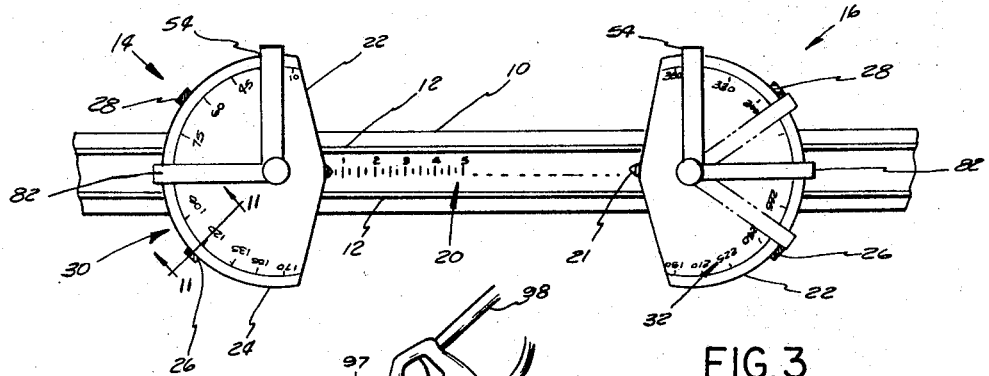
FIG. 3 is a plan view of the preferred apparatus illustrating one of the saw-supporting pedestals rotated in phantom between its alternate cutting positions.

As can best be seen in FIG. 3, a linear scale 20 is defined on the frame 10 between the tracks 12, and a pointer 21 is mounted on the cutting station 16 to assist the operator in positioning the cutting stations 14 and 16 at a distance determining the length of the finished truss element 18. Thus in the preferred embodiment, the unfinished lumber can be double end cut to a length as short as 20 inches and as long as may be desired, limited only by the length of the frame 10.

Each of the cutting stations comprises a substantially semicircular carriage 22 slideably mounted on the track elements 12. Each of the carriages 22 has a channel-shaped peripheral member 24. A pair of stops 26 and 28 are clamped to the channels 24 at selected positions corresponding to the pitch at which the ends of the truss element 18 are to be cut.

Figure 11:
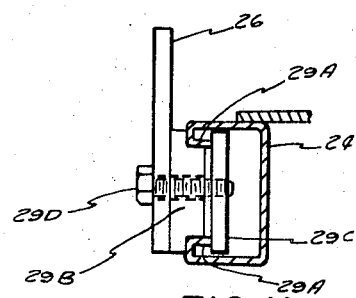
FIG. 11 is an enlarged cross-sectional view taken substantially on the line 11–11 of FIG. 3.

FIG. 11 illustrates the manner in which the stop 26 is clamped in position. The channel 24 has a channel-shaped cross section including a pair of inwardly directed lips 29A. A T-shaped member 29B, a nut 29C, and a bolt 29D cooperate to releasably clamp the stop 26 in position. By rotating the bolt in one direction, the member 29B and nut 29C tightly engage the lips 29A of the channel. The stop 26 is clamped between the head of the bolt 29D and the T-shaped member 29B in an upright position. Rotation of the bolt 29D in a reverse direction loosens the member 29B and nut 29C to permit the operator to reposition the stop 26. The stop 28 is similarly clamped to its respective channel.

A protractor 30 is formed around the periphery of the carriage 22 of the station 14 and a protractor 32 is formed around the periphery of the carriage 22 of the station 16. The protractors 30 and 32 comprise a series of indicia formed in graduations around the center of each of the carriages 22. The protractor 30 on the work station 14 preferably has indicia formed at regular intervals from 10° and increasing in a counterclockwise direction to 170°. The protractor 32 of the work station 16 preferably has indicia laid out in regular intervals and increasing from 190° in a counterclockwise direction to 350°.

A clamping device 34 is mounted on each of the carriages 22. The clamping devices 34 support the unfinished lumber 18 for a downward cutting engagement with a power saw. Referring to FIG. 8, each clamping device 34 includes an upright support 36. An L-shaped lower clamping jaw 38 is fixed to the upper end of the support 36 and has an upwardly directed side section 40. A horizontally extending threaded pin 42 is fixed to the side section 40 and receives an upper L-shaped jaw member 44 having a downwardly depending side section 46 which is normally in face-to-face relationship with the side section 40 of the lower jaw member. The upper jaw member 44 has a vertical slot 48 which is received by the pin 42. A nut 50 carried on the pin 42 retains a spring bias member 52 which acts against the downwardly depending side 46 of the upper jaw member to maintain the horizontal section of the upper jaw member in a horizontal position so that the upper jaw member 44 and the lower jaw member 38 form a substantially C-shaped clamping means.

A guide member 53 is fixed to the lower jaw 38 in alinement with the horizontal portion of the lower jaw. The guide member 53 assists the operator in placing the unfinished lumber in the clamp.

This clamping arrangement permits the unfinished lumber to be inserted through the open mouth of the C-shaped clamping means and seated on the lower jaw in abutment with the upwardly extending side 40. The yieldable upper jaw permits the operator to quickly seat the unfinished lumber in position and to remove the finished truss element from the two clamping devices 34. The preferred clamping devices 34 also provide a rigid support for the lumber for a downwardly moving cutting blade.

Referring to FIGS. 4, 5, 6 and 7 for a description of the preferred cutting station, each of the cutting stations comprises a channel-shaped arm 54 which is rotatably mounted on the carriage 22. A horizontal angle 58 is mounted at the upper end of the pedestal 56 and carries a pair of horizontally extending parallel arms 60. The arms 60 extend from the angle 58 toward the center of rotation of the pedestal 56 and each has a series of pin mounting holes 62.

Figure 4:
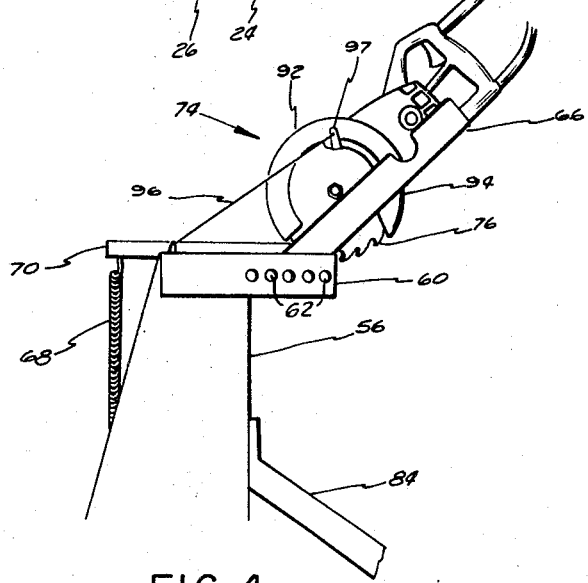
FIG. 4 is an elevational view of the preferred saw-supporting pedestal illustrating the saw-supporting arm in its raised position with the telescopic guard partially extended.

An elongated pivot pin 64 is journalled in a selected pair of mounting holes. A saw-supporting arm 66 is pivotally mounted on the pivot pin 64 and is movable between raised and lowered positions. FIGS. 4 and 6 illustrate the saw-supporting arm 66 in its raised position and FIG. 5 shows the arm 66 in its lowered position. The saw-supporting arm 66 moves between its vertical positions toward and away from the clamping means 34.

An elongated spring 68 having its lower end anchored to the arm 54 and its upper end connected to an arm 70 carried by the pivot arm 66 to normally maintain the pivot arm 66 in its raised position. The arm 70 is biased downwardly until it abuts the angle 58.

Referring to FIG. 7, the saw-supporting arm 66 has a width less than the length of the pivot pin 64 between the arms 60 thereby permitting the arm 66 to be laterally adjusted between the fixed supporting arms 60. A plurality of spacers 72 mounted on the pivot pin 64 position the arm 66 in place to accommodate the particular cut that is to be made.

A power saw 74 is mounted on each of the arms 66. Each saw 74 has a rotary cutting blade 76 which engages the lumber when the arm 66 is lowered toward its horizontal position. Thus it can be seen that the cutting plane of the blade 76 is defined by the position of the arm 66 on the pivot pin 64. The cutting engagement between the blade 76 and the unfinished lumber is defined by the selected pair of apertures 62 in which the pivot pin is seated. This position is determined by a number of factors including the diameter of the cutting blade 76, the cross-sectional dimensions of the lumber 18 and the particular pitch at which the unfinished lumber is to be cut.

Figure 2:
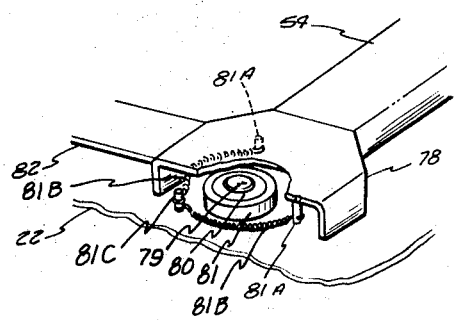
FIG. 2 is an enlarged perspective view of the spring-biased means employed for maintaining the saw-supporting pedestal in a neutral position.

Referring to FIG. 2, the inner end of each arm 54 is attached to a housing 78. A journal 79 depends down from the housing and is rotatably mounted in a bearing 80 carried by a bearing holder 81 carried by the carriage 22. The bearing 80 permits the arm 54 to be easily rotated between cutting positions.

A pair of pins 81A depend from the housing 78 and are connected by springs 81B to a pin 81C fixedly mounted on carriage 22. The springs 81B are arranged on opposite sides of the journal 79 so that rotation of the arm 54 in one direction extends one of the springs and rotation in the opposite direction extends the opposite spring. Thus an arm 82 which extends at right angles from the housing 78 relative to the arm 54 assumes a neutral position when any external forces on the arms 54 and 82 are released so that the springs assume a balanced condition. In this neutral position, the arm 82 is generally alined with the longitudinal axis of the frame 10 (as particularly seen in FIG. 3) with the saw 74 swung into a position permitting the operator to readily insert and remove the unfinished and finished lumber from the clamping devices 34.

The arm 82 extends beyond the periphery of the carriage 22 so that when the pedestal is rotated away from its neutral position, the arm 82 moves into abutment with one of the stops 26 or 28. As heretofore described, the stops 26 and 28 are clamped in positions corresponding to the selected pitch angles. Swinging the pedestal toward and into abutment with the stop 28, the operator lowers the saw-supporting arm 66 until the saw engages the lumber in a cutting relationship. The operator then releases the saw which is automatically raised under the influence of the spring 68 out of engagement with the lumber 18. He also releases the arm 82 so that the pedestal swings to its neutral position. The operator then swings the pedestal in the opposite direction until the arm 82 abuts the companion stop 26, lowers the saw and completes the second cut on the end of the lumber 18. This sequence of steps is then performed at the cutting station 16 to form the opposite end of the truss element 18.

Normally the operator is given four individual angles for setting up the machine so that when he positions the stops 26 and 28 of each of the cutting stations, there is no chance of clamping the stops in the wrong position. This is because a different set of indicia is associated with the protractor 30 than is associated with the protractor 32. This is opposed to a system wherein each of the protractors has a similar set of indicia.

It can also be seen that the cutting blade 76 normally engages the unfinished truss element 18 closely adjacent the longitudinal axis of the lumber in a downward cutting stroke and closely adjacent the clamping device 34 so that the lower jaw 38 provides a maximum support.

A chute 84 is carried by each of the upright pedestals 56 below the cutting area so that the sawed off sections of lumber are collected as they fall. In addition, the rotating blade 76 creates a downwardly directed draft which helps to deliver the sawed off portions of lumber into the chute 84. A barrel 85 or other suitable container can be positioned to receive the scrap from the chute 84.

It is obvious that the length of cut obtained on a truss element is related to the diameter of the cutting blade. Referring to FIG. 9, when it is desired to form a truss element having an end with a single cut such as at 86, the center of rotation of the cutting blade is generally in vertical alinement with the longitudinal axis of the truss element 18. Where a double-ended cut is to be made, the position of the cutting blade 76 can be adjusted by positioning the saw-supporting arm 66 on the pin 64 so that the center of rotation of the cutting blade 76 is offset from the longitudinal axis of the truss element 18 to provide an initial cut at 88 and then a second cut as at 90 in the second position of the pedestal 56.

In order to achieve an end cut with a very high pitch, that is to say where the cutting plane of the blade forms a relatively acute angle with the longitudinal axis of the truss element 18, thereby requiring a substantially long cut, or when the lumber is of excessive width, a cutting blade having a relatively small diameter can provide such a long cut in a two-step process by first sawing half of the cut at one station, turning the truss element 18 end-for-end and forming the second half of the cut at the opposite station.

Referring to FIGS. 4, 5 and 10, the saw 74 has a novel form of telescopic guard means for protecting the operator from an accidental exposure to the cutting edge of the blade 76 as the saw 74 is raised between cutting and noncutting positions. A fixed, arcuate, channel-shaped guard 92 encloses the upper half of the circumferential edge of the blade as it rotates. A movable, channel-shaped guard 94 is telescopically engaged within the fixed guard 92 and is swingable about the axis of rotation of the blade 76. A wire 96 has one end connected to an arm 97 extending from the upper end of the movable guard 94 and its opposite end anchored to the horizontal angle support 58. The lower anchored end of the wire 96 is on the side of the pivot pin 64 opposite the position of the saw 74 as it pivots between its raised and lowered positions. Thus as the saw is lowered from its raised position, illustrated in FIG. 4, the wire 96 causes the movable guard 94 to retract within the fixed guard 92 thereby exposing a sufficient circumferential segment of the cutting blade 76 to engage the lumber 18 in a cutting relationship. Similarly, when the saw 74 is raised from its cutting position, the movable guard 94 extends from within the fixed guard and encloses a substantial portion of the exposed cutting periphery of the blade 76 thereby protecting the operator from accidentally coming into contact with the rotating blade.

Preferably each of the saws 74 is provided with an elongated handle 98 with a rubber grip 100. The handles 98 permit the operator to lower and raise the saws 74 without coming into close contact with the saws.

A taut, overhead line 102 supports the electrical cords 104 of the saws 74 on awning pulleys 106 so that the saw carriages can be moved toward and away from one another without interference with the cords.

Referring to FIG. 1, a hand-operated C-clamp 108 provides means for holding the arm 82 rigidly in one position where a single cut of the same pitch is to be made on the same end of a series of truss elements.

In conclusion, I have described an improved cutting apparatus for sawing wooden truss elements such as webs and diagonals. Preferably the semicircular carriages 22 have a diameter of about 3 feet, thereby assuring a high degree of accuracy in positioning the stops 26 and 28. The length of various size truss elements can be readily accommodated because the longitudinal cutting stations 14 and 16 can be quickly changed on the frame 10. Normally the saw station 16 is movable the entire length of the track 12 and clamped in position by a quick-acting eccentric clamp (not shown) for speed and ease of operation. The saw station 14 is normally moved only short distances about 3 inches to compensate for changes in the lateral position of the saw on the pin 64. Any double end cut that is necessary for any conventional web member can be achieved with an 8-inch diameter saw regardless of the pitch merely by changing the position of the pivot pin 64 on the arms 60 thereby moving the saw toward a longer desired cut. By spring mounting both the saw-supporting arm 66 and the saw-supporting pedestal 56, the operator can quickly remove and insert the lumber without being concerned about the position of the moving components of the apparatus. The chute is preferably formed of sheet metal and collects the debris without the necessity for blowers or conveyors which are usually necessary for conventional truss cutting apparatus.

It is to be understood that although I have described the preferred embodiment of my invention in its simplest terms, various changes and revisions can be made therein without departing from the spirit of the invention or the scope of the appended claims.

I claim:

1. Cutting apparatus for shaping the end of an elongated work piece, comprising:
   a. a frame;
   b. support means for positioning an elongated workpiece on said frame;
   c. first cutting means mounted on said frame for cutting engagement with said workpiece, said first cutting means being infinitely angularly adjustable about an axis to engage said workpiece at a selected angle; and
   d. second cutting means movably mounted on said frame for cutting engagement with said workpiece, said second cutting means being infinitely angularly adjustable about an axis to engage said workpiece at a selected angle, said second cutting means being mounted for movement between selected cutting positions toward and away from said first cutting means; and means normally urging said first and said second cutting means into a neutral position other than said selected angles.

2. The cutting apparatus as defined in claim 1, including scale means on said frame for indicating the distance between the engagement of said first and second cutting means with said workpiece.

3. The cutting apparatus as defined in claim 1, including first protractor means mounted on said frame for indicating the angular disposition of said first cutting means relative to said workpiece, and second protractor means mounted on said frame for indicating the angular disposition of said second cutting means relative to said workpiece.

4. The cutting apparatus as defined in claim 3, wherein said first and second protractor means each have an individual series of indicia associated with the angular disposition of their respective cutting means.

5. A cutting apparatus as defined in claim 1, further comprising a pedestal rotatably mounted on said frame; a pivotal support arm mounted on said pedestal; said cutting means comprising a saw mounted on said pivotal support arm for movement toward and away from cutting engagement with said workpiece, and including a position-defining arm fixedly carried by said pedestal and extending radially from the axis of rotation of said pedestal; a stop adjustably mounted on said frame in a position corresponding to a selected angle of engagement between said saw and said workpiece, said stop being disposed in the path of rotation of said position-defining arm and abutting said position-defining arm when said saw is in said selected angle of engagement.

6. The cutting apparatus as defined in claim 5, including a second stop, said first mentioned stop and said second stop being mounted in selected positions on a graduated scale, and on opposite sides of a neutral position of said position-defining arm.

7. The cutting apparatus as defined in claim 5, wherein said pivotal support arm is mounted for movement between raised and lowered positions, and including bias means for normally urging said pivotal support arm toward a raised position so that said saw is spaced from said workpiece, said bias means being yieldable to a pulldown force for lowering said saw into cutting engagement with said workpiece.

8. The invention as defined in claim 7, including clamping means for locking said position-defining arm in a position spaced from said neutral position.

9. The cutting apparatus as defined in claim 5, including chute means mounted on said pedestal below the area of cutting engagement of said saw with said workpiece.

10. The cutting apparatus as defined in claim 5, wherein said saw has a circular cutting edge and including a first channel-shaped guard enclosing a circumferential segment of said cutting edge, a second channel-shaped guard being mounted for swinging movement about the center of rotation of said circular cutting blade, said pivotal arm being vertically movable toward and away from a lowered position wherein the cutting edge of said blade engages a workpiece, and means for retracting said movable guard within said fixed guard to expose the cutting edge of said blade as said pivotal arm is lowered.

11. Cutting apparatus for shaping the end of an elongated workpiece comprising:
   a. a frame;
   b. workpiece support means mounted on said frame;
   c. saw-supporting means mounted on said frame and rotatable about an axis, said saw-supporting means including a pivotal support arm;
   d. a saw mounted on said pivotal support arm for movement toward and away from cutting engagement with a workpiece mounted on said support means;
   e. a position-defining arm carried by said saw-supporting means and extending radially from the axis of rotation of said saw-supporting means; and
   f. a stop mounted on said frame for infinite adjustment between positions corresponding to selected angles of engagement between the cutting edge of said saw with said workpiece, said stop being engageable with said position-defining arm when said saw-supporting means is rotated about said axis.

12. A cutting apparatus as defined in claim 11, including bias means normally urging said saw-supporting means toward a neutral position with said position-defining arm being spaced from said stop.

13. The cutting apparatus as defined in claim 12, wherein said position-defining arm traverses a graduated scale when said saw-supporting means is rotated.

14. The cutting apparatus as defined in claim 12, including a second stop, said first-mentioned stop and said second stop being infinitely adjustably mounted in selected positions on a graduated scale and on opposite sides of the neutral position of said position-defining arm.

15. The cutting apparatus as defined in claim 11, wherein said saw-supporting means comprises:
   a. a pedestal mounted on said frame and rotatable about said axis; and
   b. means for adjustably mounting said pivotal support arm on said pedestal at a selected distance from the longitudinal axis of said workpiece so that said saw can be raised and lowered about a selected pivot point in an arc of cutting engagement with said workpiece.

16. The cutting apparatus as defined in claim 15, wherein said last-mentioned means comprises:
   a. a pivot pin;
   b. means for journalling said pivot pin on said pedestal at a selected distance from the longitudinal axis of said workpiece; and
   c. said pivotal support arm being mounted on said pivot pin for movement between raised and lowered positions.

17. The cutting apparatus as defined in claim 16, including resilient bias means acting on said pivotal support arm for normally urging said pivotal support arm toward a raised position, said resilient bias means being yieldable to a pulldown force for lowering said saw into cutting engagement with said workpiece.

18. The cutting apparatus as defined in claim 16, wherein said saw includes a rotatable blade and the position of said pivotal support arm on said pivot pin is adjustable in directions perpendicular to the plane of rotation of said rotatable blade.

19. The cutting apparatus as defined in claim 11, including chute means mounted on said saw-supporting means and below the cutting engagement of said saw with said workpiece for receiving sawed-off portions of said workpiece.

20. In combination, a support, an arm pivotably mounted on said support for movement between first and second operative positions, a saw having a rotating blade with a circular cutting edge mounted on said arm, a first channel-shaped guard fixedly carried by said saw for enclosing and shielding a circumferential segment of said cutting edge of said saw, a second channel-shaped guard mounted for rotational sliding movement within said first guard about the center of rotation of said circular cutting blade, said arm being pivoted between said first and second operative positions along an arcuate path for movement toward and away from a lower cutting position wherein said circumferential segment of said cutting edge engages a workpiece, said cutting edge being movable along said arcuate path, a flange carried by said second channel-shaped guard and movable therewith, said flange being axially displaced from said second channel-shaped guard outside of said first channel-shaped guard, a wire connecter having one end fixed to said support and spaced from the pivot point of said arm in a direction opposite to the movement of said arm as said arm is pivoted toward said lower cutting position, the opposite end of said wire connecter being attached to said second guard flange, said wire connecter restraining movement of said flange along said first-mentioned arcuate path such that said flange follows a second arcuate path different from said first-mentioned arcuate path so that said second channel-shaped guard is retracted within said first channel-shaped guard by means of the restraint of said wire connecter as said saw is lowered toward said lower cutting position, whereby said enclosed and shielded circumferential segment of said cutting edge is exposed.

UNITED STATES PATENT OFFICE
CERTIFICATE OF CORRECTION

Patent No. 3,543,815　　　　　　　　Dated　December 1, 1970

Inventor(s)　Donald C. Menge　　　　　　(TSC-107-A)

It is certified that error appears in the above-identified patent and that said Letters Patent are hereby corrected as shown below:

Column 3, line 34, after "5;" delete "and angle;"

Column 7, line 70, change "7" to --6--

SIGNED AND
SEALED
FEB 9 1971

FEB. 9, 1971

(SEAL)
Attest:

Edward M. Fletcher, Jr.　　　　　　　　WILLIAM E. SCHUYLER, JR
Attesting Officer　　　　　　　　　　　Commissioner of Patents